(No Model.)

J. H. DEMONET.
DENTAL MALLET.

No. 504,912. Patented Sept. 12, 1893.

WITNESSES:
H. Walker
C. Sedgwick

INVENTOR
J. H. Demonet
BY
Munn & Co
ATTORNEYS.

UNITED STATES PATENT OFFICE.

JOHN H. DEMONET, OF BROOKLYN, NEW YORK.

DENTAL MALLET.

SPECIFICATION forming part of Letters Patent No. 504,912, dated September 12, 1893.

Application filed December 6, 1892. Serial No. 454,214. (No model.)

*To all whom it may concern:*

Be it known that I, JOHN H. DEMONET, of Brooklyn, in the county of Kings and State of New York, have invented a new and useful Improvement in Dental Mallets, of which the following is a full, clear, and exact description.

My invention relates to an improvement in power or hand driven devices that are employed by dentists to consolidate fillings in the hollow teeth of patients; and has for its object to provide a simple, neat, portable device of the type indicated, which will be adapted to strike a proper blow on a supported plugging tool by a rotatable movement of parts of the improved device in either direction; a further object being to provide such a mallet with a convenient means for instantly stopping its action when desired.

To these ends, my invention consists in the construction and combination of parts, as is hereinafter described and claimed.

Reference is to be had to the accompanying drawings forming a part of this specification, in which similar letters of reference indicate corresponding parts in both of the figures.

Figure 1:
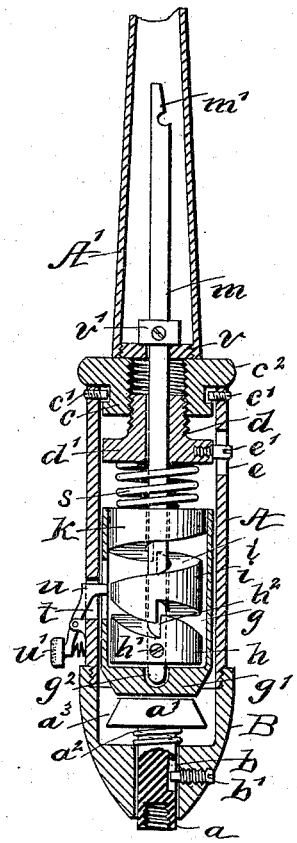
Figure 2:
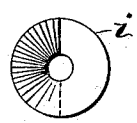

Figure 1 is a longitudinal sectional view of the device and a handle in part; and Fig. 2 is a face view of a cam block which is a feature of the invention.

The shell A, that is the main portion of the handle for the mallet, is cylindrical, and of suitable length and diameter to receive the working parts. The shell A, has a preferably conoidal head-piece B, secured to its front end by screw threads, or other means, which piece is axially perforated to receive the cylindrical shank $a$, which loosely fits in the head-piece and projects a proper degree at each end. On the inner terminal of the shank $a$, the anvil block $a'$ is integrally formed, or thereto secured, and the outer end portion of the part $a$, is axially perforated and internally threaded to receive and retain any one of a set of plugging tools of approved form. The shank $a$ is longitudinally grooved a short distance on its peripheral surface, as at $b$, to admit the point of a guide pin $b'$, that is screwed into a transverse tapped hole formed for its reception in the head-piece B, the pin serving to hold the shank from displacement and permit a limited reciprocating motion to be given to the anvil block $a'$.

Upon the shank $a$, a coiled spring $a^2$ is located, between the anvil block $a'$ and the inner wall of a cavity $a^3$, formed in the head-piece B, wherein the anvil block reciprocates, which spring is designed to elastically support said anvil block, and return it to its normal position after it has been projected by a blow on its face.

At the opposite end of the shell A, a swivel nut $c$ is introduced, a cylindric projection on the side of the nut being adapted to enter and loosely fit the caliber of the shell at its end, there being a circumferential groove formed in the cylindric projection for an engagement therewith, of the opposite set screws $c'$, which are screwed through tapped holes in the shell and enter the groove, thus retaining the nut $c$ in connection with the shell and free to rotate. A radial flange $c^2$ is formed on the portion of the nut $c$ that projects beyond the shell A, which circular flange is by preference milled or otherwise roughened to adapt it for manipulation when the nut is to be rotated.

An axial perforation of proper size is formed through the swivel nut $c$, which is internally threaded to receive the threaded body of the extension block $d$, which is diametrically enlarged on its inner end, producing an integral collar $d'$, of such a relative diameter as will produce a loose fit between the interior surface of the shell A, and the periphery of the collar. Opposite the collar $d'$, a slot $e$ is longitudinally formed in the shell A, of a suitable length to allow the extension piece to be regulated for length, a set screw $e'$ passing through the slot $e$, into a tapped hole in the collar $d'$, from which it projects so as to prevent a rotation of the extension piece.

A cylindrical case $g$ is provided for the reception of cam blocks $h$, $i$, $k$, which will be presently described. Said case consists of a cylindric wall which loosely fits within the shell A, is of a proper length to serve as a cam holder, and has a hammer block $g'$, formed or secured on its end that is nearest to the anvil $a'$, which hammer is in disk form and flat on its face that is designed to strike upon the level face of the anvil.

A central cupped perforation $g^2$ is formed in the hammer block $g'$, from its rear surface toward the anvil $a'$, for the rotatable support of the drive shaft $m$, which is rounded in the body and of the same diameter throughout its length, which latter is sufficient to permit the shaft to extend from its journal end that engages the cupped bearing $g^2$ through the case $g$, and also through an axial perforation in the extension block $d$, beyond which it projects a suitable degree, its terminal end $m'$ thus projected, being formed to have a locking engagement with any device preferred, that will transmit rotary motion to the shaft.

On the end portion of the shaft $m$, which is within the case $g$, the cam block $h$, is mounted and secured thereto by a set screw $h'$, a central perforation in it permitting such a connection of parts to be produced. This cam block is rounded on the edge, and in diameter is proportioned to adapt it to loosely fit within the case $g$. The end face of the cam block $h$, is true and parallel with the cupped surface of the hammer block $g'$. On the opposite end of the block $h$, a spiral cam is formed, that is of a pitch or degree of cam projection that will adapt it to push the hammer block $g'$ a proper distance when actuated by the rotatable shaft $m$, and the other cams as will be explained, a shoulder at $h^2$, indicating the degree of throw of the cam block.

The cam block $k$ is similar in form and size to the cam block $h$, and is also axially perforated to allow it to be slid loosely upon the shaft $m$, and have its rounded periphery secured to the inner surface of the case $g$, its flat side being opposite the inner end of the extension block $d$. The cam block $k$, is located at such a distance from the block $h$, as will permit the double faced cam block $i$, to be introduced between said blocks and loosely engage the shaft $m$, so as to alternately interlock one of its cam faces $i'$ with the cam face of the block $h$, or the duplicate block $k$. A spiral spring $s$ is introduced between the inner face of the extension block $d$ and cam block $k$, and is adapted to force the case $g$ and hammer block $g'$ toward the anvil block $a'$, the degree of pressure exerted by said spring being controlled by the adjustment of the extension block $d$ longitudinally.

The shell A, is apertured in slot form at $t$, for the reception of the toe of a spring dog $u$, whereon a thumb piece $u'$ is formed, which when depressed by the operator of the mallet will release the toe from the case $g$, through which it also penetrates, a slot being formed in the latter to permit the toe to enter and hold the case from rotating, thus causing the case to slide when the toe of the dog engaging the case-slot and either of the cams $h$ or $k$ have a locked engagement with the center cam $i$, while the shaft $m$ is rotated in either direction.

A preferably sheet metal sheath A', in tubular form is attached to the swivel nut $c$, and projects from its outer side, thus affording a cover for the shaft $m$, and a finish for the instrument. There is a head wall $v$, formed or affixed to the end of the sheath A', which is in engagement with the swivel nut $c$, this wall being centrally pivoted to receive and form a bearing for the shaft $m$, a collar $v'$, that is adjustably secured on the shaft bearing loosely on the head wall, so as to prevent an end thrust of the shaft and adapt the spring $s$, to perform its function.

In operation, the device is connected by the shaft $m$ to a source of rotary motion and power, and the shell or handle of the instrument grasped by an operator who places a thumb or finger upon the push button $u'$. The parts $h$, $i$, $k$, which are shown in Fig. 1, as separated, for the purposes of illustrating them clearly, should be so set that their shoulders will interlock, and their cam faces loosely impinge on each other, so that in either direction of motion given to the shaft $m$, the center cam will interlock its shoulder on one cam, and slide on the opposite cam, the yielding of the spring $s$, permitting such an action and enforcing the contact of parts. It will be evident, that a rotary movement of the shaft $m$, in either direction will slide the case $g$, a distance equal to the throw of the cam block, and strike the anvil block $a'$ a succession of rapid blows, the force of which may be graduated by an adjustment of the extension block $d$, as before explained; hence, if the shank $a$, is fitted with any desired shape of plugging tool in bar form, the latter will be reciprocated to effect a consolidation of material in a tooth that is being filled. The reciprocation of the case $g$, will be effected while the dog $u$, is in engagement with the slot in the case, and when the operation of the mallet is to be temporarily arrested, the operator presses upon the thumb piece $u'$, which will permit the case $g$ to rotate, and stop the action of the cams within it.

Having thus fully described my invention, I claim as new and desire to secure by Letters Patent—

1. In a dental mallet, the combination, with a shell, a longitudinal rotatably supported shaft therein, an interior case, opposite longitudinal slots in the shell and case, and a spring pressed dog adapted to engage said slots and lock the shell and case together, of three laterally locking cam blocks in the case engaging the shaft and case all located on the shaft, and a spring pressed anvil block adapted to slide in a head piece of the shell, normally resting near the hammer block, and struck thereby when said block is reciprocated by the rotatable shaft and cams thereon, subtantially as described.

2. In a dental mallet, the combination, with a cylindrical shell, a head-block on one end of the shell, apertured axially, and a swivel nut on the other end of the shell, of a case within the shell, a hammer head thereon, an anvil supported to slide in the shell head piece near the hammer, a coiled spring for the anvil, an adjustable extension block on the swivel nut in the shell, a longitudinal, rotatable drive shaft in the case, a spiral cam faced block in the case secured to the shaft, a mating cam block secured in the case and loose on the shaft, a double faced spiral cam between the other cams and loose on the shaft, a spiral spring between a cam block and the extension block, a tubular sheath having a head wall perforated to support the shaft, a collar on said shaft, and a latching dog on the shell adapted to vibrate and lock the case and shell together or release the case, substantially as described.

JOHN H. DEMONET.

Witnesses:
   FRANK P. ABBOTT,
   EDWIN W. WATKINS.